(12) United States Patent
Jung

(10) Patent No.: US 12,705,342 B2
(45) Date of Patent: Aug. 11, 2026

(54) MEMORY DEVICE FOR PERFORMING TARGET REFRESH OPERATION, AND OPERATION METHOD THEREOF

(71) Applicant: SK hynix Inc., Gyeonggi-do (KR)

(72) Inventor: Chul Moon Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 349 days.

(21) Appl. No.: 18/315,508

(22) Filed: May 11, 2023

(65) Prior Publication Data

US 2024/0202328 A1 Jun. 20, 2024

(30) Foreign Application Priority Data

Dec. 19, 2022 (KR) ........................ 10-2022-0178149

(51) Int. Cl.

*G06F 21/55* (2013.01)
*G06F 21/56* (2013.01)
*G06F 21/79* (2013.01)

(52) U.S. Cl.

CPC .......... *G06F 21/554* (2013.01); *G06F 21/566* (2013.01); *G06F 21/79* (2013.01); *G06F 2221/034* (2013.01)

(58) Field of Classification Search

CPC ...... G06F 21/554; G06F 21/566; G06F 21/79; G06F 2221/034; G06F 3/0659; G11C 11/408; G11C 11/40611; G11C 11/4078

See application file for complete search history.

(56) References Cited

U.S. PATENT DOCUMENTS 10,573,370 B2 * 2/2020 Ito ........................ G11C 11/4076
10,832,792 B1 * 11/2020 Penney ............. G11C 11/40607
10,861,530 B2 12/2020 Yamada et al.
2019/0122722 A1 * 4/2019 Yamada ................ G11C 11/408
2019/0385667 A1 * 12/2019 Morohashi ........ G11C 11/40611
2022/0050793 A1 * 2/2022 Saroiu ...................... G06F 21/79
2022/0059153 A1 * 2/2022 Zhang ................... G11C 11/406
2022/0068361 A1 3/2022 Du et al.
2022/0189539 A1 6/2022 Li et al.
2023/0205428 A1 * 6/2023 Kim .................... G11C 11/4078 711/105
2023/0298655 A1 * 9/2023 Hong .................. G11C 11/4078
2023/0409708 A1 * 12/2023 Wang ........................ G11C 7/24

FOREIGN PATENT DOCUMENTS

KR 10-2019-0048132 A 5/2019

* cited by examiner

*Primary Examiner* — Philip J Chea
*Assistant Examiner* — Ghizlane Maazouz
(74) *Attorney, Agent, or Firm* — IP & T GROUP LLP

(57) ABSTRACT

A memory device includes a refresh latch configured to generate a first aggressive address by latching an address input with a refresh management command; a detection circuit configured to sequentially store the first aggressive address as a plurality of first candidate addresses, and generate a detection signal according to a number of duplicated addresses among the plurality of the first candidate addresses; an address sampling circuit configured to generate a second aggressive address by collecting information on rows subjected to a row-hammer attack; and an output control circuit configured to output, as a target address, the first aggressive address or the second aggressive address according to the refresh management command and the detection signal.

4 Claims, 11 Drawing Sheets

FIG. 3

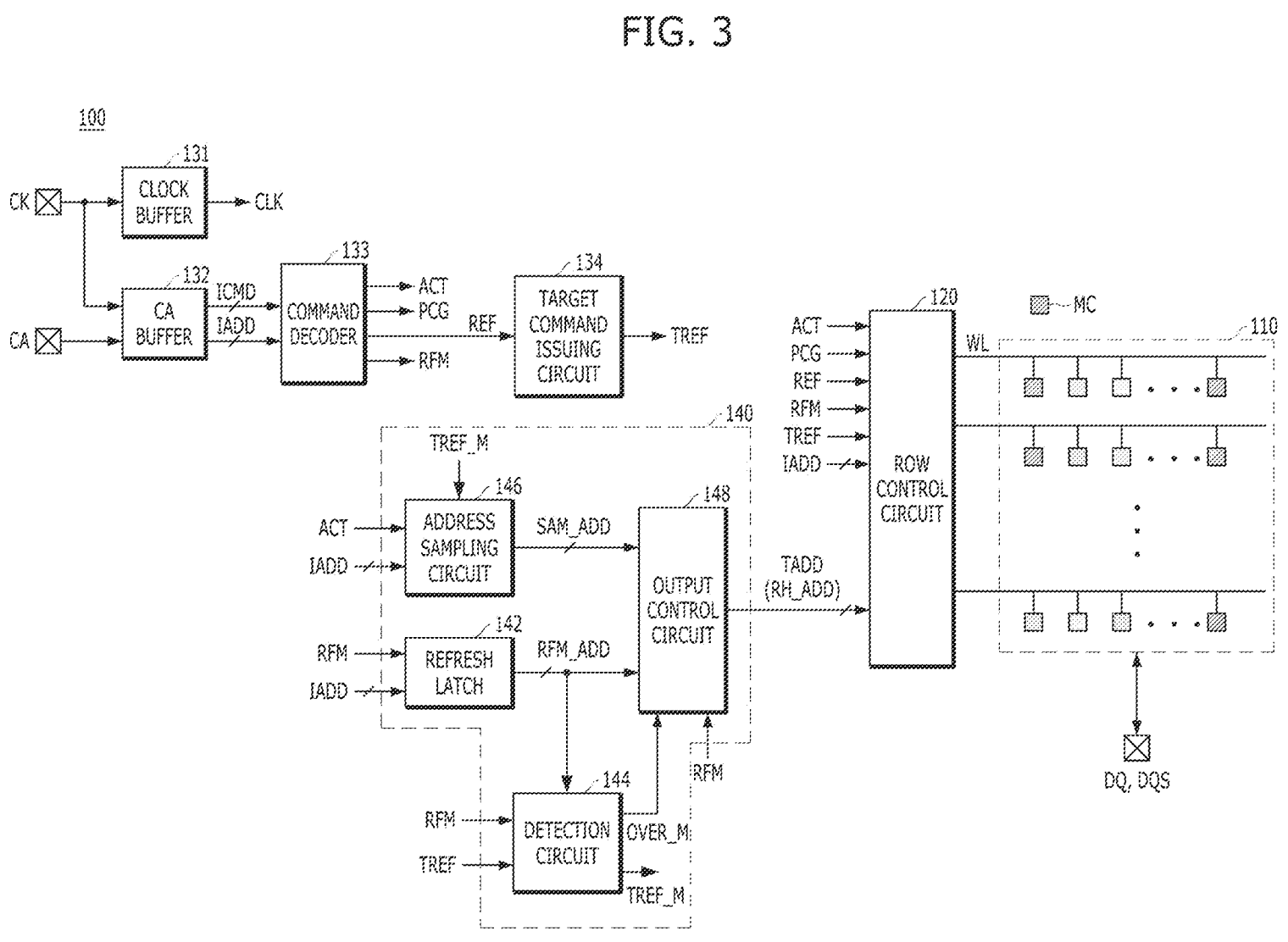

100
CK
CA
131 CLOCK BUFFER
CLK
132 CA BUFFER
ICMD
IADD
133 COMMAND DECODER
ACT
PCG
REF
RFM
134 TARGET COMMAND ISSUING CIRCUIT
TREF
140
146 ADDRESS SAMPLING CIRCUIT
TREF_M
ACT
IADD
SAM_ADD
142 REFRESH LATCH
RFM
IADD
RFM_ADD
144 DETECTION CIRCUIT
RFM
TREF
OVER_M
TREF_M
148 OUTPUT CONTROL CIRCUIT
RFM
TADD (RH_ADD)
120 ROW CONTROL CIRCUIT
ACT
PCG
REF
RFM
TREF
IADD
WL
MC
110
DQ, DQS

144

RST_M

320

RFM

RFM_ADD

310_1

310_2

310_3

310_4

L_RADD1

L_RADD2

L_RADD3

L_RADD4

DUPLICATION DECISION CIRCUIT

OVER_M

TREF_M

RFM

TREF

FIG. 6

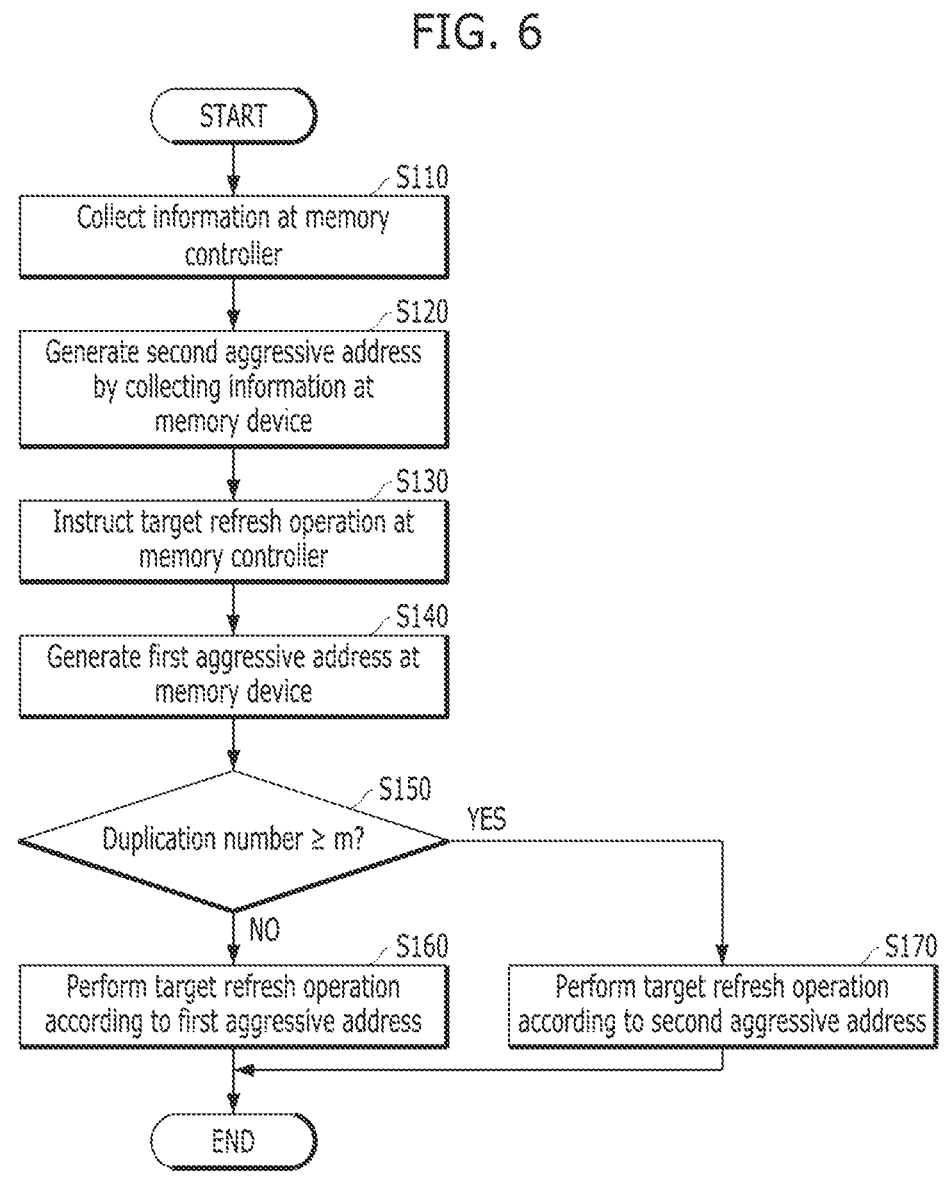

START
S110 Collect information at memory controller
S120 Generate second aggressive address by collecting information at memory device
S130 Instruct target refresh operation at memory controller
S140 Generate first aggressive address at memory device
S150 Duplication number ≥ m?
YES
NO
S160 Perform target refresh operation according to first aggressive address
S170 Perform target refresh operation according to second aggressive address
END

Figure 9:
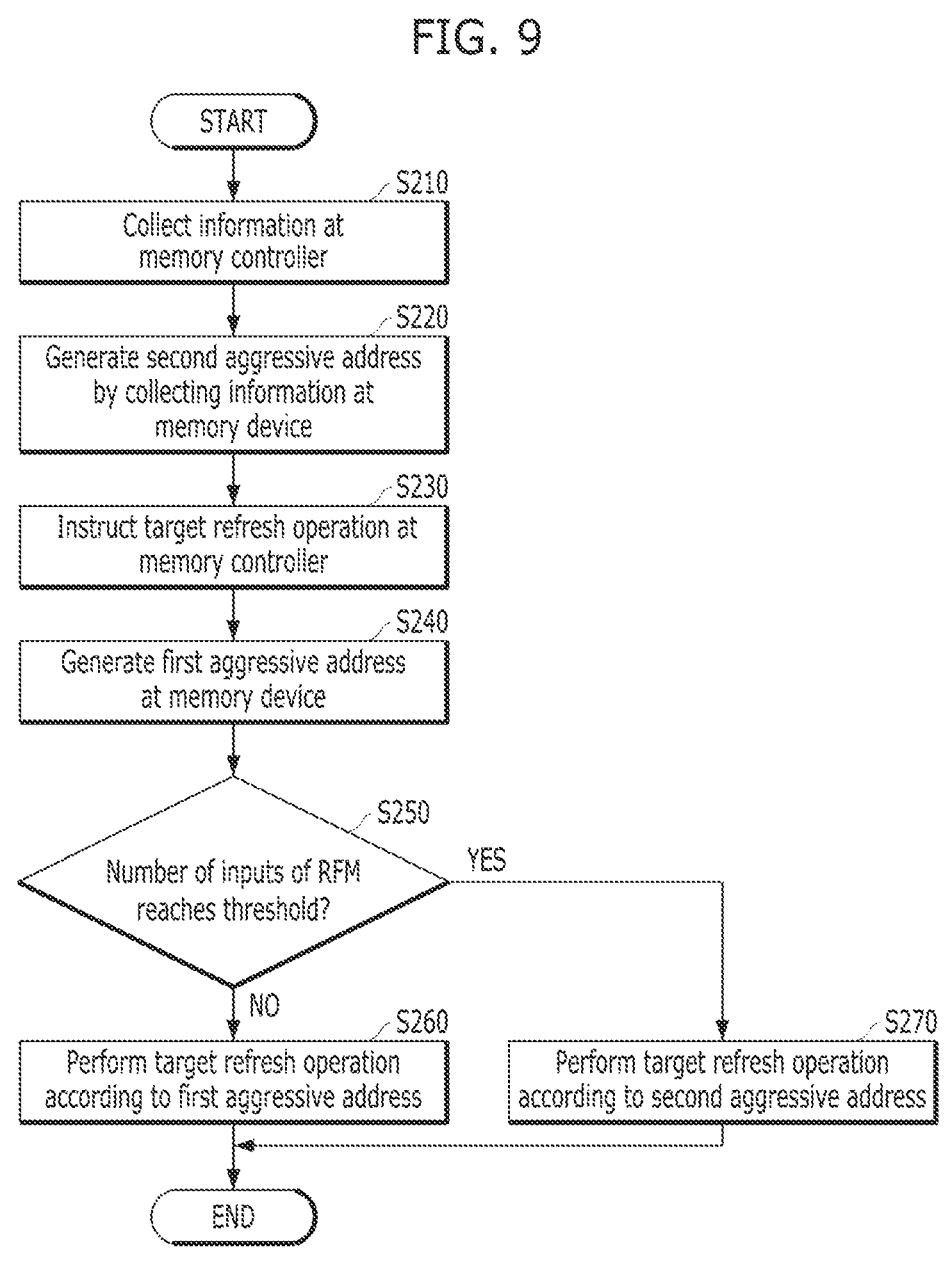

START

S210 Collect information at memory controller

S220 Generate second aggressive address by collecting information at memory device S230 Instruct target refresh operation at memory controller S240 Generate first aggressive address at memory device S250 Number of inputs of RFM reaches threshold?

YES

NO

S260 Perform target refresh operation according to first aggressive address

S270 Perform target refresh operation according to second aggressive address

END

FIG. 11A

RFM RFM RFM RFM

N2_RATE = 0.25

N2_M

RACT (±1) (±1) (±1) (±1)(±2)

FIG. 11B

RFM_ADD

SAM_ADD

RFM RFM RFM RFM

OVER_M

N2_RATE = 0.25

N2_M

TADD

RACT (±1)(±1) (±1)(±1) (±1)(±1) (±1)(±2)

MEMORY DEVICE FOR PERFORMING TARGET REFRESH OPERATION, AND OPERATION METHOD THEREOF

CROSS-REFERENCE TO RELATED APPLICATIONS

The present application claims priority under 35 U.S.C. § 119(a) to Korean Patent Application No. 10-2022-0178149, filed on Dec. 19, 2022, which is incorporated herein by reference in its entirety.

BACKGROUND

1. Field

Various embodiments of the present invention relate to a semiconductor design technology, and more particularly, to a memory system including a semiconductor memory device that performs a target refresh operation for row-hammer mitigation.

2. Description of the Related Art

Recently, in addition to a normal refresh operation, an additional refresh operation which will be, hereinafter, referred to as a 'target refresh operation', is being performed on the memory cells of a specific word line that is likely to lose data due to a row-hammer phenomenon. The row-hammer phenomenon refers to a phenomenon in which data of memory cells coupled to a specific word line or the word lines disposed adjacent to the word line are damaged due to a high number of activations of the corresponding word line. In order to prevent the row-hammer phenomenon, a target refresh operation is performed on a word line that is activated more than a predetermined number of times and word lines disposed adjacent to the word line.

Recently, a memory controller has provided a refresh command (hereinafter, referred to as a refresh management command) to a memory device to instruct a target refresh operation, in addition to a normal refresh command that instructs to perform a normal refresh operation. Accordingly, a method of efficiently performing a target refresh operation by a memory device has been studied.

SUMMARY

Embodiments of the present invention are directed to a memory device capable of performing a target refresh operation according to a refresh management command by selecting one of an aggressive address collected by a memory controller or an aggressive address collected by itself, and an operation method thereof.

Embodiments of the present invention are directed to a memory device for a refresh rate for temperature according to a total number of issuances of a refresh management command provided by a memory controller and a target refresh command internally generated, and an operation method thereof.

According to an embodiment of the present invention, a refresh latch configured to generate a first aggressive address by latching an address input with a refresh management command; a detection circuit configured to sequentially store the first aggressive address as a plurality of first candidate addresses, and generate a detection signal according to a number of duplicated addresses among the plurality of the first candidate addresses; an address sampling circuit configured to generate a second aggressive address by collecting information on rows subjected to a row-hammer attack; and an output control circuit configured to output, as a target address, the first aggressive address or the second aggressive address according to the refresh management command and the detection signal.

According to an embodiment of the present invention, an operation method of a memory device includes input with a refresh management command, and sequentially storing the first aggressive address as a plurality of first candidate addresses; generating a second aggressive address by collecting information on rows subjected to a row-hammer attack; refreshing, according to the refresh management command, one or more rows regarding the first aggressive address; and refreshing one or more rows regarding the second aggressive address when a number of duplicated addresses becomes m or more, among the plurality of the first candidate addresses while the refresh management command is input k times, where k is a natural number and m is a natural number less than or equal to k.

According to an embodiment of the present invention, a memory device includes a refresh latch configured to generate a first aggressive address by latching an address input with a refresh management command; a detection circuit configured to generate a detection signal according to a number of inputs of the refresh management command; an address sampling circuit configured to generate a second aggressive address by collecting information on rows subjected to a row-hammer attack; and an output control circuit configured to output, as a target address, the first aggressive address or the second aggressive address according to the refresh management command and the detection signal.

According to an embodiment of the present invention, an operation method of a memory device includes generating a first aggressive address by latching an address input with a refresh management command; generating a second aggressive address by collecting information on rows subjected to a row-hammer attack; refreshing, according to the refresh management command, one or more rows regarding the first aggressive address; and refreshing one or more rows regarding the second aggressive address when a number of inputs of the refresh management command reaches a threshold.

According to an embodiment of the present invention, a memory device includes a refresh latch configured to generate a first aggressive address by latching an address input with a refresh management command; a detection circuit configured to: determine, according to refresh rate information, whether to activate an additional refresh signal when the refresh management command is input, and generate a detection signal when the refresh management command is input and the additional refresh signal is determined to be deactivated; an address sampling circuit configured to generate a second aggressive address by collecting information on rows subjected to a row-hammer attack; and an output control circuit configured to output, as a target address, the first aggressive address or the second aggressive address according to the refresh management command and the detection signal.

According to an embodiment of the present invention, an operation method of a memory device includes generating a first aggressive address by latching an address input with a refresh management command; generating a second aggressive address by collecting information on rows subjected to a row-hammer attack; refreshing, according to the refresh management command, one or more first adjacent rows of a first target row corresponding to the first aggressive address; and refreshing, according to the refresh management command, one or more adjacent rows of a second target row corresponding to the second aggressive address when it is determined that refreshing for second adjacent rows of the first target row is omitted according to refresh rate information.

According to an embodiment of the present invention, an operation method of a memory device includes performing a target refresh operation using a commanded address in response to a command provided together with the commanded address; and performing the target refresh operation using an independently identified address after the target refresh operation using the commanded address is performed, in response to the command a predetermined number of times.

According to an embodiment of the present invention, an operation method of a memory device includes performing first and second target refresh operations in response to each of commands each provided together with a commanded address, the first target refresh operation being performed on a first group of rows using the commanded address and the second target refresh operation being performed using an independently identified address; and performing, in response to a group of the commands, the first target refresh operation on a second group of rows using the commanded address without the second target refresh operation.

According to embodiments of the present invention, the memory device may improve a defense capability against a row-hammer attack.

BRIEF DESCRIPTION OF THE DRAWINGS

FIG. 3 is a detailed block diagram illustrating a memory device in accordance with a first embodiment of the present invention.

FIG. 6 is a flow chart for describing an operation of a memory system including the memory device of FIG. 3, in accordance with the first embodiment of the present invention.

FIG. 7 is a detailed block diagram illustrating a memory device in accordance with a second embodiment of the present invention.

FIG. 9 is a flow chart for describing an operation of a memory system including the memory device of FIG. 7, in accordance with the second embodiment of the present invention.

FIGS. 11A and 11B are timing diagrams for describing a conventional target refresh operation and a target refresh operation, depending on a preset refresh rate according to an embodiment of the present invention.

DETAILED DESCRIPTION

Figure 1:
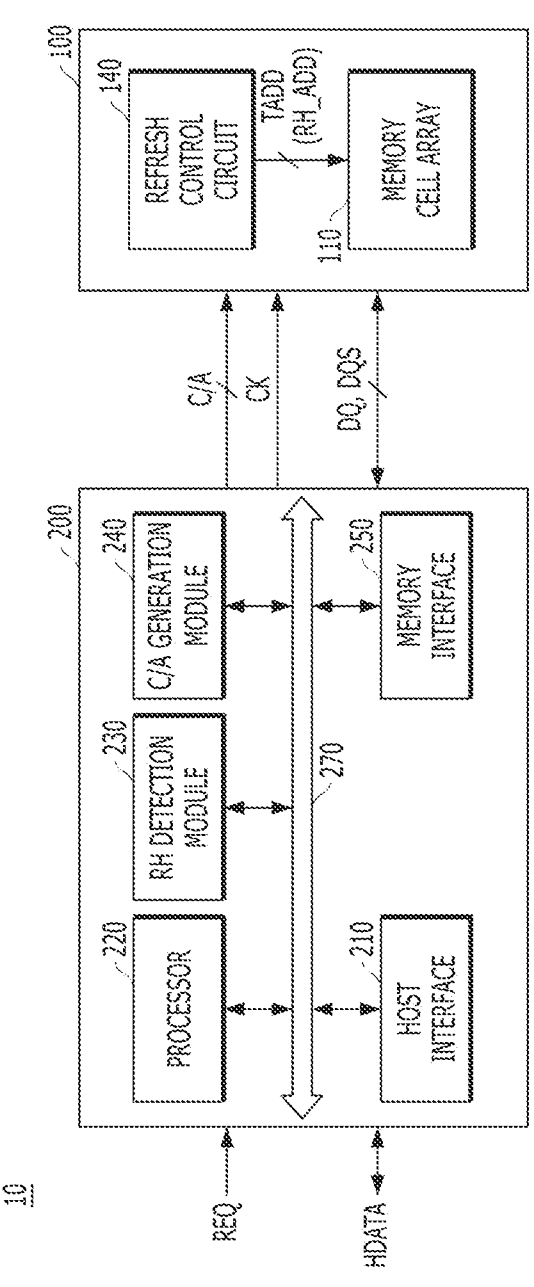
FIG. 1 is a block diagram illustrating a memory system in accordance with an embodiment of the present invention.

Various embodiments of the present disclosure will be described below in more detail with reference to the accompanying drawings. The present disclosure may have embodiments in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present disclosure.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

FIG. 1 is a block diagram illustrating a memory system 10 in accordance with an embodiment of the present disclosure.

Referring to FIG. 1, the memory system 10 may include a memory device 100 and a memory controller 200.

The memory controller 200 may control a general operation of the memory system 10 and it may control general data exchange between a host and the memory device 100. The memory controller 200 may generate a command/address signal C/A according to a request REQ from the host, and provide the generated command/address signal C/A to the memory device 100. The memory controller 200 may provide a clock CK together with the command/address signal C/A to the memory device 100. The memory controller 200 may provide data DQ corresponding to host data HDATA provided from the host to the memory device 100 together with a data strobe signal DQS. The memory controller 200 may receive the data DQ read from the memory device 100 together with the data strobe signal DQS, and provide the data DQ and the data strobe signal DQS to the host as the host data HDATA.

The host may include a Central Processing Unit (CPU), Graphic Processing Unit (GPU), Application Processor (AP), etc. The memory controller 200 may be included in the CPU, GPU, AP, etc. In this case, the host may refer to the components other than the memory controller 200 in these configurations. For example, if the memory controller 200 is included in the CPU, the host may represent the other components excluding the memory controller 200 in the CPU.

In detail, the memory controller 200 may include a host interface 210, a processor 220, a row-hammer (RH) detection module 230, a command/address (C/A) generation module 240, a memory interface 250, and a bus 270.

The host interface 210 may be configured to communicate with the host connected to the memory system 10 under the control of the processor 220. For example, the host interface 210 may receive the request REQ and the host data HDATA from the host, and provide the host data HDATA to the host by receiving the data DQ read from the memory device 100 through the memory interface 250.

The processor 220 may perform various types of computational and/or other operations for controlling the memory device 100, and/or may execute instructions in the form of firmware or other types of software. The processor 220 may receive the request REQ and the host data HDATA provided from the host through the host interface 210. The processor 220 may generate various commands corresponding to the request REQ, such as an active command, a precharge command, a normal refresh command, a refresh management command, a read command, a write command, a mode register command and the like, and an address. The processor 220 may transmit the host data HDATA to the memory interface 250. The processor 220 may change the order in which the request REQ is received from the host and the order of the operation to be instructed to the memory device 100 to improve the performance of the memory device 100. For example, the processor 220 may adjust the order so that a write operation is performed before a read operation, even if the host requests the read operation of the memory device 100 first and the write operation later. The processor 220 may control overall operations of the host interface 210, the RH detection module 230, the C/A generation module 240, and the memory interface 250.

The RH detection module 230 may collect information on word lines (hereinafter referred to as rows) in the memory device 100, which have been subjected to a row-hammer attack, based on the commands and addresses provided by the processor 220. The RH detection module 230 may collect information on the rows attacked by the row-hammer, using a combination of various methods, such as counting the activation number of rows of the memory device 100 and randomly sampling rows activated in the memory device 100. The RH detection module 230 may transmit the collected information to the C/A generation module 240. For reference, a target refresh operation may be performed on adjacent rows of a row (hereinafter, referred to as a target row) determined to have been attacked the most by the RH detection module 230. For example, if the RH detection module 230 determines that a 73-th row of the memory device 100 have been attacked the most, the memory device 100 may perform a target refresh operation on 72-th and 74-th rows, which are adjacent to the 73-th rows.

The C/A generation module 240 may generate the command/address signal C/A by scheduling the commands and address provided from the processor 220 and the RH detection module 230. The C/A generation module 240 may provide an address to be activated, together with the active command or the precharge command, as the command/address signal C/A, provide the normal refresh command as the command/address signal C/A, and provide an address assigning the target row, together with the refresh management command, as the command/address signal C/A.

The memory interface 250 may be configured to communicate with the memory device 100 under the control of the processor 220. For example, the memory interface 250 may transmit the command/address signal C/A and the data DQ to the memory device 100, and transmit the data DQ read from the memory device 100 to the host interface 210.

The processor 220 may transmit data between the host interface 210, the RH detection module 230, the C/A generation module 240, and the memory interface 250 via the bus 270. According to an embodiment, the host interface 210, the RH detection module 230, the C/A generation module 240, and the memory interface 250 may communicate with each other independently without passing through the bus 270. For example, the RH detection module 230 and host interface 210 may communicate directly with each other without passing through the bus 270. The RH detection module 230 and the memory interface 250 may communicate with each other directly without passing through the bus 270. The host interface 210 and the memory interface 250 may also communicate directly with each other without passing through the bus 270.

The memory device 100 may perform an active operation, a precharge operation, a refresh operation, a write operation, and a read operation according to the clock CK, the command/address signal C/A, the data strobe signal DQS, and/or the data DQ, which are provided from the memory controller 200. The memory device 100 may be a memory that requires a refresh operation. For example, the memory device 100 may be DRAM, or it may be another type of memory that requires the refresh operation. The refresh operation may include a normal refresh operation in which the memory device 100 sequentially refreshes a plurality of rows, and a target refresh operation in which one or more neighboring rows disposed adjacent to a row having a large number (or frequency) of activations are refreshed.

The memory device 100 may generate an active command (ACT of FIG. 3), a precharge command (PCG of FIG. 3), a normal refresh command (REF of FIG. 3), and a refresh management command (RFM of FIG. 3), which are related to a row control operation, based on the command/address signal C/A. The memory device 100 may also generate a read command or a write command related to a data input/output operation, based on the command/address signal C/A.

The memory device 100 may generate an internal target refresh command (TREF of FIG. 3) whenever the number of inputs of the normal refresh command REF reaches a preset number of times. The refresh management command RFM is a command provided by the memory controller 200 for the target refresh operation, and the internal target refresh command TREF may be a command generated by the memory device 100 itself for the target refresh operation. The memory device 100 may perform the normal refresh operation according to the normal refresh command REF, and the target refresh operation according to the refresh management command RFM or the internal target refresh command TREF.

In detail, the memory device 100 may include a memory cell array 110 and a refresh control circuit 140.

The memory cell array 110 may include a plurality of memory cells coupled to a plurality of word lines (hereinafter, referred to as a plurality of rows) and a plurality of bit lines (hereinafter, referred to as a plurality of columns), and may be arranged in the form of an array.

The refresh control circuit 140 may provide a target address TADD to select a row to be refreshed during the target refresh operation, among the plurality of rows, based on the command/address signal C/A. The refresh control circuit 140 may generate a first aggressive address by latching an address provided with the refresh management command RFM, and may generate a second aggressive address by sampling an address provided with the active command ACT. The refresh control circuit 140 may output the target address TADD by selecting one of the first aggressive address and the second aggressive address. According to an embodiment, when the target address TADD is an address that specifies a target row, the refresh control circuit 140 may calculate row-hammer addresses RH_ADD that specify adjacent rows of the target row using the target address TADD and provide them sequentially to the memory cell array 110. The refresh control circuit 140 may refresh adjacent rows regarding the target address TADD (or the row-hammer addresses RH_ADD) according to the refresh management command RFM or the internal target refresh command TREF.

With the above configuration, the memory device 100 may perform the target refresh operation based on the first aggressive address according to the refresh management command RFM, and the target refresh operation based on the second aggressive address according to the internal target refresh command TREF.

In particular, according to a first embodiment of this invention, when the first aggressive address is repetitively or duplicatedly input for a certain number of times, the memory device 100 may perform a target refresh operation on a row corresponding to the second aggressive address rather than the first aggressive address. A detailed configuration and operation of the memory device 100 according to the first embodiment of the present invention will be described with reference to FIGS. 3 to 6.

In addition, according to a second embodiment of this invention, when the number of inputs of the refresh management command RFM reaches a threshold, the memory device 100 may perform a target refresh operation on a row corresponding to the second aggressive address rather than the first aggressive address. A detailed configuration and operation of the memory device 100 according to the second embodiment of the present invention will be described with reference to FIGS. 7 to 9.

Figure 2:
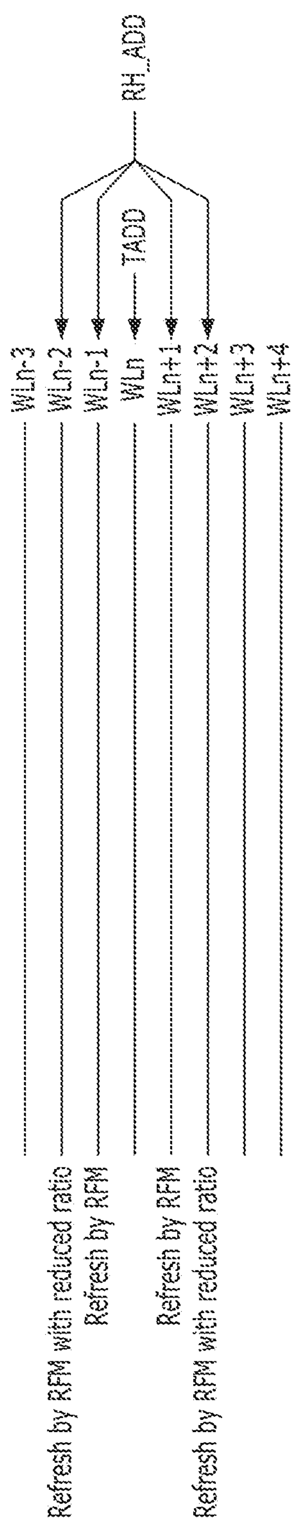
FIG. 2 is a diagram for describing a target refresh operation according to a refresh management command in accordance with an embodiment of the present invention.

During a target refresh operation, the target refresh operation may be performed on adjacent rows at a refresh rate reduced compared to the most adjacent rows (i.e., physically closest rows to a target row), according to a specification. Referring to FIG. 2, a target refresh operation according to a refresh management command RFM is described. When the target row with a high number of activations is an n-th row WLn, the target row WLn may be designated by the target address TADD, and the adjacent rows WLn−1, WLn+1, WLn−2, and WLn+2 may be designated by the row-hammer addresses RH_ADD. In this case, rows physically closest to the target row WLn in a column direction may be defined as first adjacent rows WLn−1 and WLn+1, and rows physically closest to the first adjacent rows WLn−1 and WLn+1 in the column direction may be defined as second adjacent rows WLn−2 and WLn+2. During the target refresh operation, the first adjacent rows WLn−1 and WLn+1 may always be refreshed, and the second adjacent rows WLn−2 and WLn+2 may be refreshed at a reduced refresh rate. For example, if the refresh rate is set to 0.25, the second adjacent rows WLn−2 and WLn+2 may be refreshed once every four refresh operations on the first adjacent rows WLn−1 and WLn+1.

According to a third embodiment of this invention, when a target refresh operation is not performed on the second adjacent rows depending on the reduced refresh rate, the memory device 100 may perform the target refresh operation on a row corresponding to the second aggressive address rather than the first aggressive address, according to the refresh management command RFM. A detailed configuration and operation of the memory device 100 according to the third embodiment of the present invention will be described with reference to FIGS. 10 to 12.

As described above, the memory device 100 according to the embodiments of the present invention may perform a target refresh operation on a row corresponding to the first aggressive address provided from the outside, or the second aggressive address sampled by itself, according to the refresh management command RFM. Accordingly, the refresh operation may be performed flexibly, thereby increasing the refresh efficiency and maximizing the defense capability against the row-hammer attack.

Hereinafter, various embodiments of the present invention will be described with reference to the drawings. In the following embodiments, a detailed description of a configuration related to a data input/output operation will be omitted in order to focus on a refresh operation.

FIG. 3 is a detailed block diagram illustrating the memory device 100 in accordance with the first embodiment of the present invention.

Referring to FIG. 3, the memory device 100 may include a memory cell array 110, a row control circuit 120, a clock buffer 131, a command/address (CA) buffer 132, a command decoder 133, a target command issuing circuit 134, and a refresh control circuit 140.

The memory cell array 110 may include a plurality of memory cells MC coupled to rows WL and columns may be arranged in the form of an array. The memory cell array 110 may be composed of at least one bank. The number of banks or the number of memory cells MC may be determined depending on the capacity of the memory device 100.

The clock buffer 131 may receive a clock CK from the memory controller (200 of FIG. 1). The clock buffer 131 may generate an internal clock CLK by buffering the clock CK. Depending on an embodiment, the memory controller 200 may transfer system clocks to the memory device 100 in a differential manner, and the memory device 100 may include clock buffers that receive the differential clocks, respectively.

The CA buffer 132 may receive a command/address signal C/A from the memory controller 200 based on the clock CK. The CA buffer 132 may sample the command/address signal C/A based on the clock CK and output an internal command ICMD and an internal address IADD. Consequently, the memory device 100 may be synchronized with the clock CK.

The command decoder 133 may decode the internal command ICMD which is output from the CA buffer 132 to generate an active command ACT, a precharge command PCG, a normal refresh command REF, and a refresh management command RFM. Although not illustrated, the command decoder 133 may additionally generate a read command, a write command, a mode register command, and the like by decoding the internal command ICMD.

The target command issuing circuit 134 may issue an internal target refresh command TREF based on the normal refresh command REF. The target command issuing circuit 134 may issue the internal target refresh command TREF whenever the number of inputs of the normal refresh command REF reaches a preset number of times.

The refresh control circuit 140 may output the internal address IADD as a first aggressive address RFM_ADD according to the refresh management command RFM, and output a second aggressive address SAM_ADD by sampling the internal address IADD according to the active command ACT. The refresh control circuit 140 may activate a detection signal OVER_M when it is detected that the first aggressive address RFM_ADD is repetitively or duplicatedly input for a certain number of times. The refresh control circuit 140 may output the first aggressive address RFM_ADD as the target address TADD according to the refresh management command RFM, but when the detection signal OVER_M is activated, output the second aggressive address SAM_ADD as the target address TADD while masking the first aggressive address RFM_ADD.

More specifically, the refresh control circuit 140 may include a refresh latch 142, a detection circuit 144, an address sampling circuit 146, and an output control circuit 148.

The refresh latch 142 may output the first aggressive address RFM_ADD by latching the internal address IADD input with the refresh management command RFM.

The detection circuit 144 may sequentially store the first aggressive address RFM_ADD as a plurality of first candidate addresses (L_RADD1 to L_RADD4 in FIG. 4) and generate the detection signal OVER_M according to a number of duplicated addresses among the first candidate addresses L_RADD1 to L_RADD4. The detection circuit 144 may activate the detection signal OVER_M when the number of duplicated addresses becomes m or more, among the first candidate addresses L_RADD1 to L_RADD4 while the refresh management command RFM is input k times, where k is a natural number and m is a natural number less than or equal to k. In addition, the detection circuit 144 may generate a sampling output signal TREF_M according to the internal target refresh command TREF or the detection signal OVER_M.

The address sampling circuit 146 may collect a plurality of second candidate addresses (L_SADD1 to L_SADD4 in FIG. 5) for rows attacked by the row-hammer, and output one of the second candidate addresses L_SADD1 to L_SADD4 as the second aggressive address SAM_ADD. For example, the address sampling circuit 146 stores the internal address IADD input with the active command ACT as the second candidate addresses L_SADD1 to L_SADD4, generates a plurality of counting values (CNT1 to CNT4 of FIG. 5) by counting numbers of inputs of the respective second candidate addresses L_SADD1 to L_SADD4, selects one of the second candidate addresses L_SADD1 to L_SADD4 according to the counting values CNT1 to CNT4, and outputs the second aggressive address SAM_ADD according to the sampling output signal TREF_M.

The output control circuit 148 may output the first aggressive address RFM_ADD or the second aggressive address SAM_ADD as the target address TADD according to the refresh management command RFM and the detection signal OVER_M. When the refresh management command RFM or the detection signal OVER_M is not input, the output control circuit 148 may output the second aggressive address SAM_ADD as the target address TADD. The output control circuit 148 may output the first aggressive address RFM_ADD as the target address TADD when the refresh management command RFM is input, but when the detection signal OVER_M is activated, output the second aggressive address SAM_ADD as the target address TADD regardless of the refresh management command RFM.

Depending on an embodiment, the refresh control circuit 140 may further include an adjacent address calculating circuit for calculating row-hammer addresses RH_ADD that designate adjacent rows of the target row using the target address TADD output from the output control circuit 148.

The row control circuit 120 may activate a row WL corresponding to the internal address IADD according to the active command ACT, and precharge the activated row WL according to the precharge command PCG. In order to select a row to be refreshed during a normal refresh operation, a refresh counter (not shown) for generating a counting address that is sequentially increasing according to the normal refresh command REF may be additionally provided. The row control circuit 120 may perform the normal refresh operation of sequentially refreshing the plurality of rows WL corresponding to the counting address according to the normal refresh command REF. The row control circuit 120 may perform the target refresh operation of refreshing one or more adjacent rows regarding the target address TADD (or the row-hammer addresses RH_ADD) according to the refresh management command RFM or the internal target refresh command TREF.

Though it is not shown, the memory device 100 may further include a column control circuit for selecting columns corresponding to a column address among the internal address IADD, according to the read command or the write command. The memory device 100 may output data DQ read from the memory cell array 110 through the selected columns, together with a data strobe signal DQS to the memory interface 250 of the memory controller 200.

Figures 4, 5:
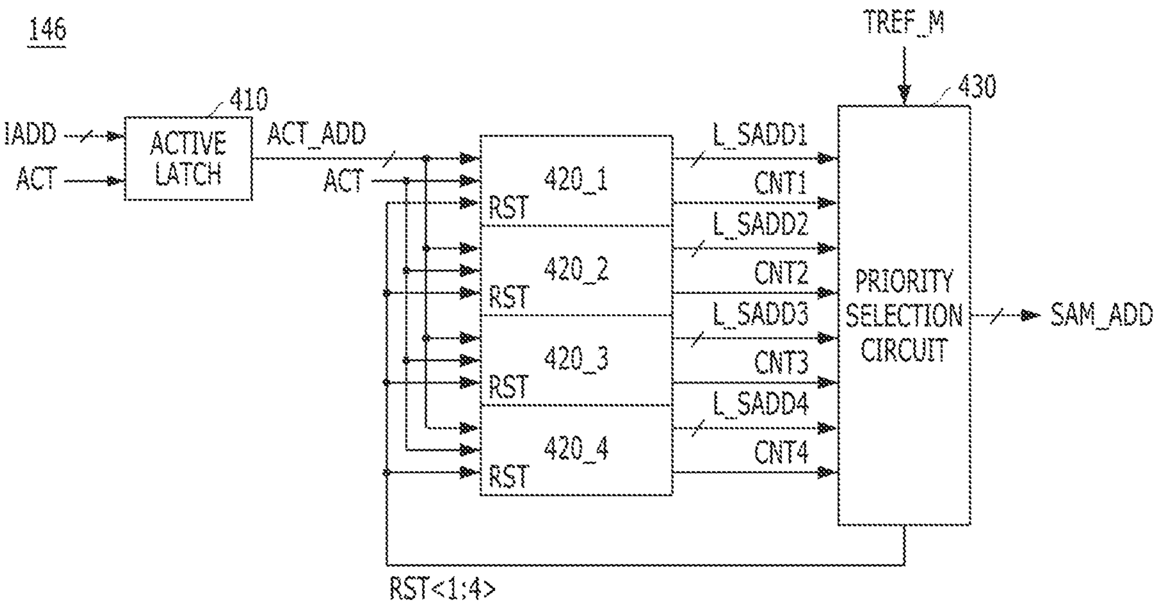
FIG. 4 is a detailed configuration diagram illustrating a detection circuit of FIG. 3.
FIG. 5 is a detailed configuration diagram illustrating an address sampling circuit of FIG. 3.

FIG. 4 is a detailed configuration diagram illustrating the detection circuit 144 of FIG. 3.

Referring to FIG. 4, the detection circuit 144 may include a plurality of address latch circuits 310_1 to 310_4 and a duplication decision circuit 320. In FIG. 4, first to fourth address latch circuits 310_1 to 310_4 are illustrated, for example.

The first to fourth address latch circuits 310_1 to 310_4 may sequentially store the first aggressive address RFM_ADD as the first candidate addresses L_RADD1 to L_RADD4 whenever the refresh management command RFM is input. According to an embodiment, the first to fourth address latch circuits 310_1 to 310_4 may be initialized as a latch reset signal RST_M is activated.

The duplication decision circuit 320 may generate the detection signal OVER_M by identifying the number of duplicated addresses among the first candidate addresses L_RADD1 to L_RADD4 stored in the first to fourth address latch circuits 310_1 to 310_4. The duplication decision circuit 320 may activate the detection signal OVER_M when the number of duplicated addresses becomes m or more among the first candidate addresses L_RADD1 to L_RADD4 while the refresh management command RFM is input k times. The duplication decision circuit 320 may activate the latch reset signal RST_M every time the refresh management command RFM is input k times. Additionally, the duplication decision circuit 320 may generate the sampling output signal TREF_M according to the internal target refresh command TREF or the detection signal OVER_M. The duplication decision circuit 320 may activate the sampling output signal TREF_M when the internal target refresh command TREF is issued. The duplication decision circuit 320 may activate the sampling output signal TREF_M when the detection signal OVER_M is activated, regardless of whether the internal target refresh command TREF is issued.

With the above configuration, the detection circuit 144 may sequentially store the first aggressive address RFM_ADD as the first candidate addresses L_RADD1 to L_RADD4, and generate the detection signal OVER_M according to the number of duplicated addresses among the first candidate addresses L_RADD1 to L_RADD4.

FIG. 5 is a detailed configuration diagram illustrating the address sampling circuit 146 of FIG. 3.

Referring to FIG. 5, the address sampling circuit 146 may include an active latch 410, a plurality of counting latches 420_1 to 420_4, and a priority selection circuit 430. In FIG. 5, first to fourth counting latches 420_1 to 420_4 are illustrated, for example.

The active latch 410 may latch the internal address IADD input with the active command ACT, to output an active address ACT_ADD. According to an embodiment, the active latch 410 may be replaced with a random sampling circuit. The random sampling circuit may randomly sample the internal address IADD input with the active command ACT according to a random signal that is randomly activated, to output the active address ACT_ADD. Since the random sampling circuit may sample and count only a part of the address used in the active operation, the area of the refresh control circuit 140 may be minimized.

The first to fourth counting latch circuits 420_1 to 420_4 may sequentially store the active address ACT_ADD as the second candidate addresses L_SADD1 to L_SADD4 whenever the active command ACT is input. The first to fourth counting latch circuits 420_1 to 420_4 may generate a plurality of counting values by comparing the respective second candidate addresses L_SADD1 to L_SADD4 with the active address ACT_ADD. That is, each of the counting values CNT1 to CNT4 may correspond to a value obtained by counting the number of inputs for a corresponding second candidate address stored in the first to fourth counting latch circuits 420_1 to 420_4. For example, the first counting latch circuit 420_1 may store [3 row, 5 times] information on the second candidate address L_SADD1 for specifying a third row and the counting value CNT1 for indicating that the third row is activated 5 times. For example, the second counting latch circuit 420_2 may store [108 row, 8 times] information on the second candidate address L_SADD2 for designating a 108-th row and the counting value CNT2 for indicating that the 108-th row is activated 8 times. The first to fourth counting latch circuits 420_1 to 420_4 may be initialized according to a reset signal RST<1:4> provided from the priority selection circuit 430. Each of the first to fourth counting latch circuits 420_1 to 420_4 may be initialized according to a corresponding bit of the reset signal RST<1:4>. The first to fourth counting latch circuits 420_1 to 420_4 may provide the stored second candidate addresses L_SADD1 to L_SADD4 and the stored counting values CNT1 to CNT4 to the priority selection circuit 430.

The priority selection circuit 430 may select one of the second candidate addresses L_SADD1 to L_SADD4 as the second aggressive address SAM_ADD according to the counting values CNT1 to CNT4. The priority selection circuit 430 may select a second candidate address corresponding to the largest counting value among the counting values CNT1 to CNT4 as the second aggressive address SAM_ADD, and output the second aggressive address SAM_ADD according to the sampling output signal TREF_M. In addition, the priority selection circuit 430 may generate the reset signal RST<1:4> to initialize a counting latch circuit storing the selected second candidate address when the second aggressive address SAM_ADD is output. For example, if the 108-th row stored in the second counting latch circuit 420_2 is selected as the second aggressive address SAM_ADD, the second bit RST<2> of the reset signal RST<1:4> is activated to initialize the second counting latch circuit 420_2 accordingly.

With the above configuration, the address sampling circuit 146 may store the internal address IADD input with the active command ACT as the second candidate addresses L_SADD1 to L_SADD4, and output the second aggressive address SAM_ADD by selecting one of the second candidate addresses L_SADD1 to L_SADD4 according to the counting values CNT1 to CNT4 which are generated by counting the numbers of inputs of the respective second candidate addresses L_SADD1 to L_SADD4.

Hereinafter, a method of operating the memory system 10 according to the first embodiment of the present invention will be described with reference to FIGS. 1 to 6.

FIG. 6 is a flow chart for describing an operation of the memory system 10 including the memory device 100 of FIG. 3, in accordance with the first embodiment of the present invention.

Referring to FIG. 6, the memory controller 200 may collect information on rows subjected to a row-hammer attack (at S110). For example, the RH detection module 230 may collect the information on the rows subjected to the row-hammer attack.

The memory device 100 may generate the second aggressive address SAM_ADD by collecting information on rows subjected to a row-hammer attack (at S120). For example, the address sampling circuit 146 may store the internal address IADD input with the active command ACT as the second candidate addresses L_SADD1 to L_SADD4, and output the second aggressive address SAM_ADD by selecting one of the second candidate addresses L_SADD1 to L_SADD4 according to the counting values CNT1 to CNT4 which are generated by counting the numbers of inputs of the respective second candidate addresses L_SADD1 to L_SADD4.

The memory controller 200 may sequentially apply the normal refresh command REF to perform a normal refresh operation. The target command issuing circuit 134 of the memory device 100 may generate the internal target refresh command TREF when the number of inputs of the normal refresh command REF reaches a preset number of times. In response to the internal target refresh command TREF, the detection circuit 144 may activate the sampling output signal TREF_M, and the address sampling circuit 146 may output the selected second aggressive address SAM_ADD. The output control circuit 148 may output the second aggressive address SAM_ADD as the target address TADD, and accordingly, the row control circuit 120 may perform a target refresh operation based on the second aggressive address SAM_ADD internally sampled according to the internal target refresh command TREF. Thereafter, the counting latch circuit storing the selected second aggressive address SAM_ADD may be initialized.

The memory controller 200 may apply the refresh management command RFM to perform a target refresh operation (at S130). For example, the RH detection module 230 may provide the collected information to the C/A generation module 240, and the C/A generation module 240 may provide an address designating the target row with the refresh management command RFM as the command/address signal C/A.

The refresh latch 142 may output the first aggressive address RFM_ADD by latching the internal address IADD input with the refresh management command RFM (at S140).

The detection circuit 144 may sequentially store the first aggressive address RFM_ADD as the first candidate addresses L_RADD1 to L_RADD4 and identify the number of duplicated addresses among the first candidate addresses L_RADD1 to L_RADD4 (at S150).

For example, if the number of duplicated addresses stays less than four (4) among the first candidate addresses L_RADD1 to L_RADD4 while the refresh management command RFM is input 10 times, the detection circuit 144 may deactivate the detection signal OVER_M ("NO" in S150). In this case, according to the refresh management command RFM, the output control circuit 148 may output the first aggressive address RFM_ADD as the target address TADD, and the row control circuit 120 may perform a target refresh operation based on the target address TADD. As a result, the memory device 100 may perform a target refresh operation to refresh a row corresponding to the first aggressive address RFM_ADD provided from the memory controller 200 according to the refresh management command RFM provided from the memory controller 200 (at S160).

On the contrary, if the number of duplicated addresses becomes 4 or greater among the first candidate addresses L_RADD1 to L_RADD4 while the refresh management command RFM is input 10 times, the detection circuit 144 may activate the detection signal OVER_M ("YES" in S150). The detection circuit 144 may activate the sampling output signal TREF_M according to the detection signal OVER_M, and the address sampling circuit 146 may output the selected second aggressive address SAM_ADD according to the sampling output signal TREF_M. The output control circuit 148 may output the second aggressive address SAM_ADD as the target address TADD, and the row control circuit 120 may perform a target refresh operation based on the target address TADD. As a result, the memory device 100 may perform a target refresh operation to refresh a row corresponding to the second aggressive address SAM_ADD sampled internally, according to the refresh management command RFM provided from the memory controller 200 (at S170). As the detection signal OVER_M is activated, the first to fourth address latch circuits 310_1 to 310_4 of the detection circuit 144 may be initialized.

The detection circuit 144 may activate the latch reset signal RST_M every time the refresh management command RFM is input 10 times, and accordingly, the first candidate addresses L_RADD1 to L_RADD4 may be initialized.

As described above, according to the refresh management command RFM provided from the memory controller 200, the memory device 100 may perform a target refresh operation on a row corresponding to the first aggressive address RFM_ADD provided from the memory controller 200, or a target refresh operation on a row corresponding to the second aggressive address SAM_ADD generated by itself. The memory device 100 according to the first embodiment of the present invention may detect a case where the memory controller 200 unnecessarily instructs the target refresh operation, and may control to perform the target refresh operation on the row corresponding to the second aggressive address SAM_ADD rather than the first aggressive address RFM_ADD. Accordingly, the refresh efficiency may be increased by reducing the case of continuously refreshing the same or duplicated address according to the refresh management command RFM.

Figure 7:
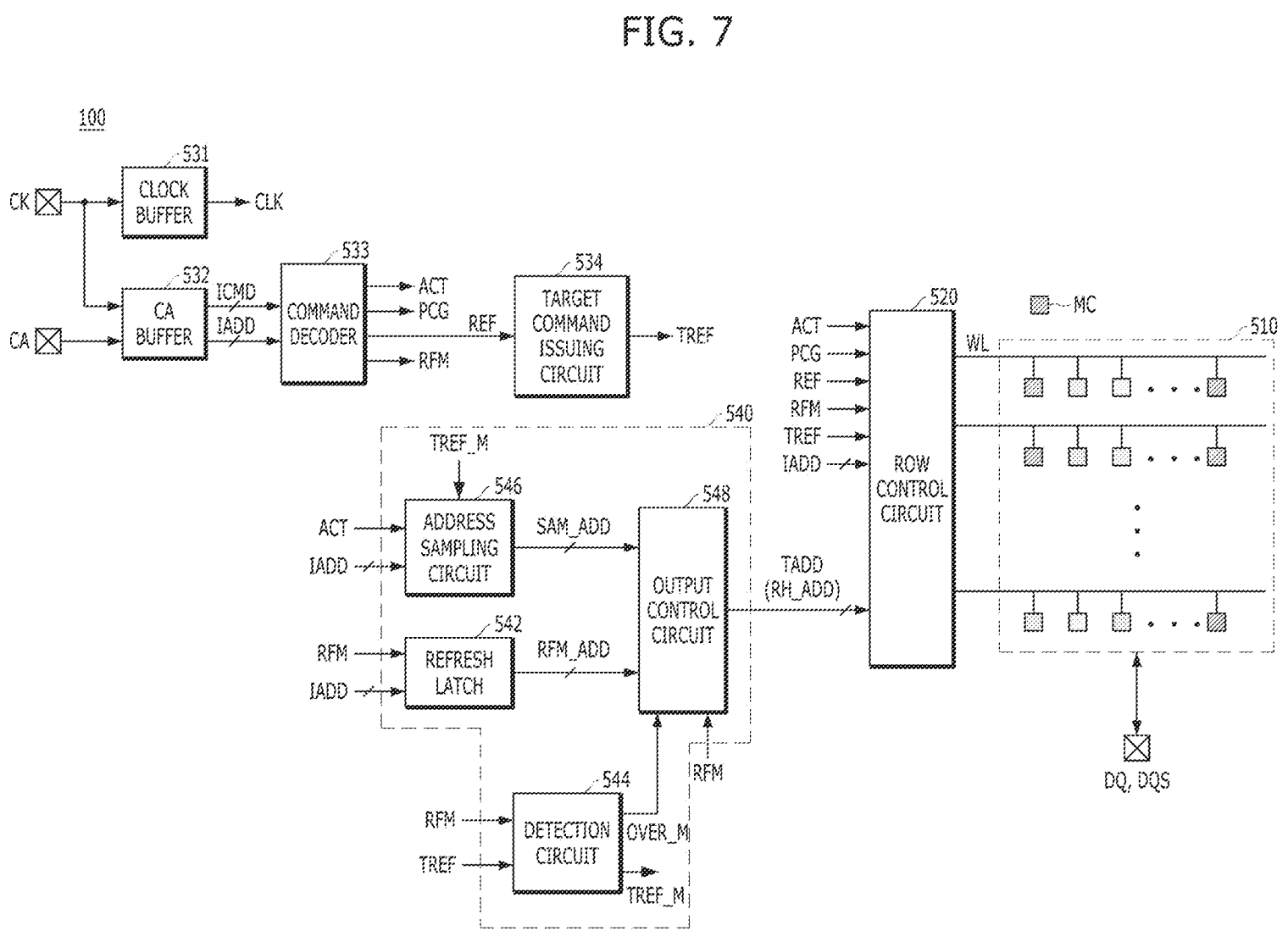
Figure 8:
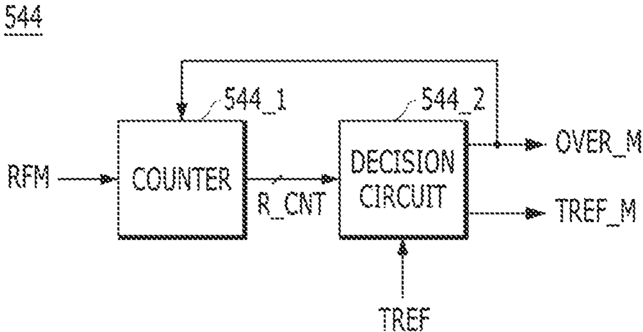
FIG. 8 is a detailed configuration diagram illustrating a detection circuit of FIG. 7.

FIG. 7 is a detailed block diagram illustrating the memory device 100 in accordance with the second embodiment of the present invention. FIG. 8 is a detailed configuration diagram illustrating a detection circuit 544 of FIG. 7.

Referring to FIG. 7, the memory device 100 may include a memory cell array 510, a row control circuit 520, a clock buffer 531, a command/address (CA) buffer 532, a command decoder 533, a target command issuing circuit 534, and a refresh control circuit 540. The memory cell array 510, the row control circuit 520, the clock buffer 531, the CA buffer 532, the command decoder 533, and the target command issuing circuit 534 of FIG. 7 have substantially the same configuration as those of FIG. 3.

The refresh control circuit 540 may output an internal address IADD as a first aggressive address RFM_ADD according to a refresh management command RFM, and output a second aggressive address SAM_ADD by sampling the internal address IADD according to an active command ACT. In the second embodiment, the refresh control circuit 540 may activate a detection signal OVER_M whenever the number of inputs of the refresh management command RFM reaches a threshold. The refresh control circuit 540 may output the first aggressive address RFM_ADD as a target address TADD according to the refresh management command RFM, but when the detection signal OVER_M is activated, output the second aggressive address SAM_ADD as the target address TADD while masking the first aggressive address RFM_ADD.

More specifically, the refresh control circuit 540 may include a refresh latch 542, a detection circuit 544, an address sampling circuit 546, and an output control circuit 548. The refresh latch 542, the address sampling circuit 546, and the output control circuit 548 of FIG. 7 have substantially the same configuration as those of FIG. 3. In particular, the address sampling circuit 546 may have substantially the same configuration as the address sampling circuit 146 of FIG. 5.

The detection circuit 544 may generate the detection signal OVER_M when it is detected that the number of inputs of the refresh management command RFM reaches the threshold. The detection circuit 544 may activate the detection signal OVER_M when a counting value which is generated by counting the number of inputs of the refresh management command RFM, reaches the threshold. In addition, the detection circuit 544 may generate a sampling output signal TREF_M according to an internal target refresh command TREF or the detection signal OVER_M. Referring to FIG. 8, the detection circuit 544 may include a counter 544_1 and a determination circuit 544_2. The counter 544_1 may be initialized by the detection signal OVER_M, and generate a counting value R_CNT by counting the number of inputs of the refresh management command RFM. The determination circuit 544_2 may activate the detection signal OVER_M when the counting value R_CNT reaches the threshold, and output the sampling output signal TREF_M according to the detection signal OVER_M or the internal target refresh command TREF.

Depending on an embodiment, the refresh control circuit 540 may further include an adjacent address calculating circuit for calculating row-hammer addresses RH_ADD that designate adjacent rows of a target row using the target address TADD output from the output control circuit 548.

Hereinafter, a method of operating the memory system 10 according to the second embodiment of the present invention will be described with reference to FIGS. 7 to 9.

FIG. 9 is a flow chart for describing an operation of the memory system 10 including the memory device 100 of FIG. 7, in accordance with the second embodiment of the present invention.

Referring to FIG. 9, the memory controller 200 may collect information on rows subjected to a row-hammer attack (at S210).

The memory device 100 may generate the second aggressive address SAM_ADD by collecting information on rows subjected to a row-hammer attack (at S220). For example, the address sampling circuit 546 may store the internal address IADD input with the active command ACT as a plurality of second candidate addresses L_SADD1 to L_SADD4, and output the second aggressive address SAM_ADD by selecting one of the second candidate addresses L_SADD1 to L_SADD4 according to counting values CNT1 to CNT4 which are generated by counting the numbers of inputs of the respective second candidate addresses L_SADD1 to L_SADD4.

The memory controller 200 may apply the refresh management command RFM to perform a target refresh operation (at S230). For example, the RH detection module 230 may provide the collected information to the C/A generation module 240, and the C/A generation module 240 may provide an address designating the target row with the refresh management command RFM as the command/address signal C/A.

The refresh latch 542 may output the first aggressive address RFM_ADD by latching the internal address IADD input with the refresh management command RFM (at S240).

The detection circuit 544 may check whether the number of inputs of the refresh management command RFM reaches the threshold (at S250). For example, the counter 544_1 may generate the counting value R_CNT by counting the number of inputs of the refresh management command RFM. The determination circuit 544_2 may activate the detection signal OVER_M when the counting value R_CNT reaches the threshold.

When the counting value R_CNT is less than the threshold (e.g., 10), the detection circuit 544 may deactivate the detection signal OVER_M ("NO" in S250). Accordingly, the memory device 100 may perform a target refresh operation to refresh a row corresponding to the first aggressive address RFM_ADD provided from the memory controller 200 according to the refresh management command RFM provided from the memory controller 200 (at S260).

On the contrary, the detection circuit 544 may activate the detection signal OVER_M when the counting value R_CNT reaches "10" ("YES" in S250). The detection circuit 544 may activate the sampling output signal TREF_M according to the detection signal OVER_M, and the address sampling circuit 546 may output the selected second aggressive address SAM_ADD according to the sampling output signal TREF_M. Accordingly, the memory device 100 may perform a target refresh operation to refresh a row corresponding to the second aggressive address SAM_ADD sampled internally, according to the refresh management command RFM provided from the memory controller 200 (at S270). As the detection signal OVER_M is activated, the counter 544_1 of the detection circuit 544 may be initialized.

Figure 10:
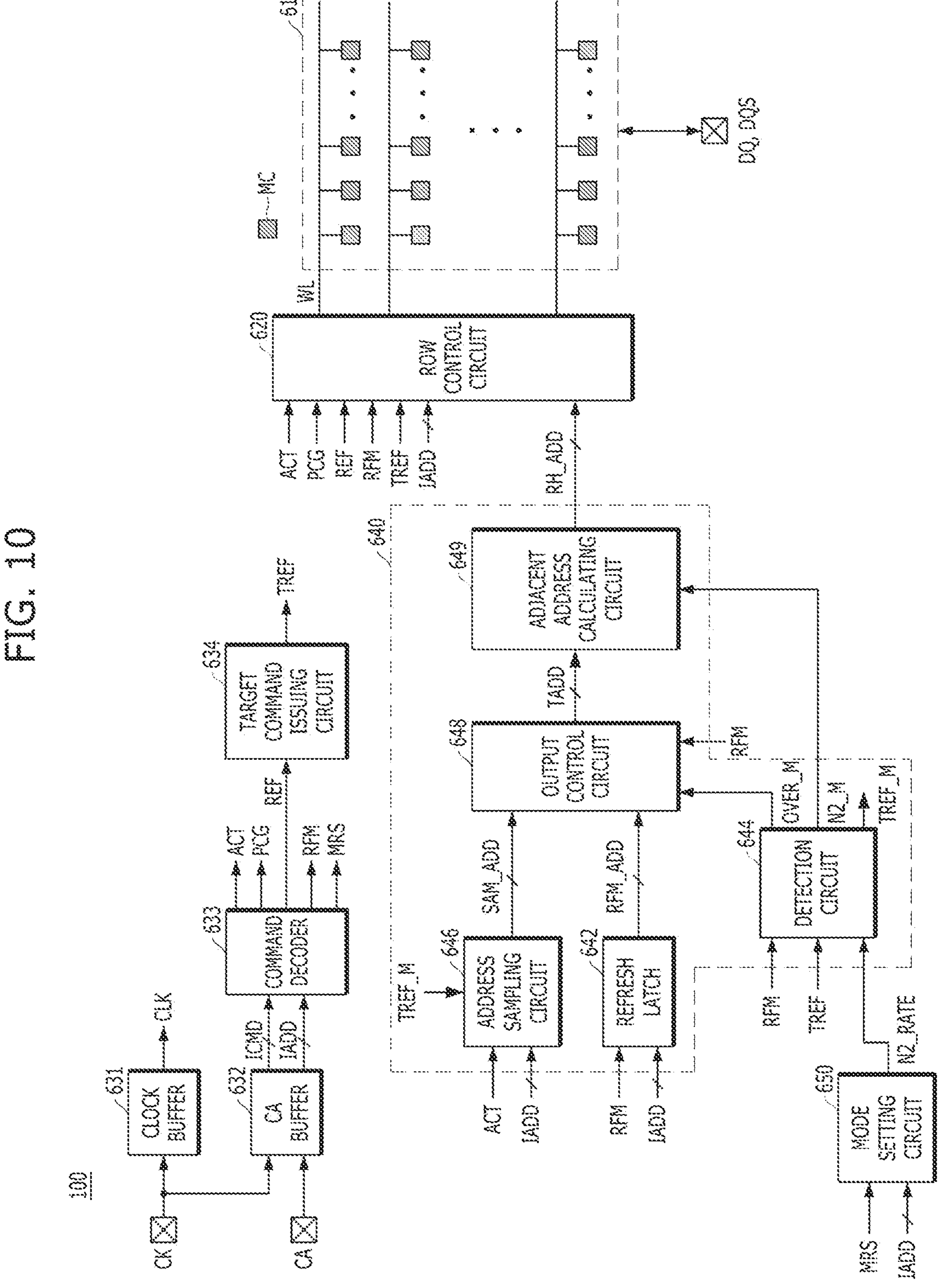
FIG. 10 is a detailed block diagram illustrating a memory device in accordance with a third embodiment of the present invention.

FIG. 10 is a detailed block diagram illustrating a memory device 100 in accordance with the third embodiment of the present invention.

Referring to FIG. 10, the memory device 100 may include a memory cell array 610, a row control circuit 620, a clock buffer 631, a command/address (CA) buffer 632, a command decoder 633, a target command issuing circuit 634, a refresh control circuit 640, and a mode setting circuit 650. The memory cell array 610, the row control circuit 620, the clock buffer 631, the CA buffer 632, and the target command issuing circuit 634 of FIG. 10 have substantially the same configuration as those of FIG. 3.

The command decoder 633 may decode an internal command ICMD which is output from the CA buffer 632 to generate an active command ACT, a precharge command PCG, a normal refresh command REF, a refresh management command RFM, and a mode register command MRS. The mode register command MRS is a command for storing and reading configuration data stored in a mode register set circuit (i.e., the mode setting circuit 650) placed in the memory device 100.

The mode setting circuit 650 may perform various setting operations by decoding at least some bits of an internal address IADD in response to the mode register command MRS. The mode setting circuit 650 may store a refresh rate, which is a ratio of first adjacent rows to second adjacent rows, and may provide refresh rate information N2_RATE to the refresh control circuit 640 in response to the mode register command MRS. For reference, the first adjacent rows may be rows physically closest to a target row, and the second adjacent rows may be rows physically closest to the first adjacent rows.

The refresh control circuit 640 may output the internal address IADD as a first aggressive address RFM_ADD according to the refresh management command RFM, and output a second aggressive address SAM_ADD by sampling the internal address IADD according to the active command ACT. In the third embodiment, the refresh control circuit 640 may activate a detection signal OVER_M when it is detected that a target refresh operation is not performed on the second adjacent rows depending on the refresh rate information N2_RATE. The refresh control circuit 640 may activate output of the first aggressive address RFM_ADD as a target address TADD according to the refresh management command RFM, but when the detection signal OVER_M is activated, output the second aggressive address SAM_ADD as the target address TADD while masking the first aggressive address RFM_ADD.

More specifically, the refresh control circuit 640 may include a refresh latch 642, a detection circuit 644, an address sampling circuit 646, an output control circuit 648, and an adjacent address calculating circuit 649.

The refresh latch 642 may output the first aggressive address RFM_ADD by latching the internal address IADD input with the refresh management command RFM.

The detection circuit 644 may determine whether to activate an additional refresh signal N2_M according to the refresh rate information N2_RATE when the refresh management command RFM is input. The additional refresh signal N2_M is a signal for determining whether to refresh the second adjacent rows. When the refresh management command RFM is input, the first adjacent rows are always refreshed, and the second adjacent rows are refreshed according to the additional refresh signal N2_M, at a rate set in the refresh rate information N2_RATE. For example, as described in FIG. 2, when the refresh rate information N2_RATE is set to 0.25, the second adjacent rows WLn−2 and WLn+2 are refreshed once every time the first adjacent rows WLn−1 and WLn+1 are refreshed 4 times. The detection circuit 644 may generate the detection signal OVER_M when the additional refresh signal N2_M stays deactivated despite the input of the refresh management command RFM. For example, when the additional refresh signal N2_M is deactivated despite the input of the refresh management command RFM and thus a target refresh operation for the second adjacent rows is omitted, the detection circuit 644 may activate the detection signal OVER_M. That is, the additional refresh signal N2_M and the detection signal OVER_M may be complementary signals. The detection circuit 644 may generate a sampling output signal TREF_M according to an internal target refresh command TREF or the detection signal OVER_M.

The address sampling circuit 646 may collect a plurality of second candidate addresses for rows attacked by the row-hammer, and output one of the second candidate addresses as the second aggressive address SAM_ADD. The address sampling circuit 646 may have substantially the same configuration as the address sampling circuit 146 of FIG. 5.

The output control circuit 648 may output the first aggressive address RFM_ADD or the second aggressive address SAM_ADD as the target address TADD according to the refresh management command RFM and the detection signal OVER_M. The output control circuit 648 may have substantially the same configuration as the output control circuit 148 of FIG. 3.

The adjacent address calculating circuit 649 may calculate one or more row-hammer addresses RH_ADD for specifying the first adjacent rows and the second adjacent rows of the target row, using the target address TADD, according to the additional refresh signal N2_M. When the additional refresh signal N2_M is deactivated, the adjacent address calculating circuit 649 may increase and/or decrease the target address TADD by one (1) to calculate one or more row-hammer addresses RH_ADD. When the additional refresh signal N2_M is activated, the adjacent address calculating circuit 649 may increase and/or decrease the target address TADD by two (2) to calculate one or more row-hammer addresses RH_ADD. The adjacent address calculating circuit 649 may sequentially provide the calculated row-hammer addresses RH_ADD to the row control circuit 620.

The row control circuit 620 may activate a row corresponding to the internal address IADD according to the active command ACT, and precharge the activated row according to the precharge command PCG. The row control circuit 620 may perform a normal refresh operation of sequentially refreshing a plurality of rows WL corresponding to a counting address according to the normal refresh command REF. The row control circuit 620 may perform the target refresh operation of refreshing one or more adjacent rows corresponding to the row-hammer addresses RH_ADD according to the refresh management command RFM or the internal target refresh command TREF.

Figures 11A, 11B:
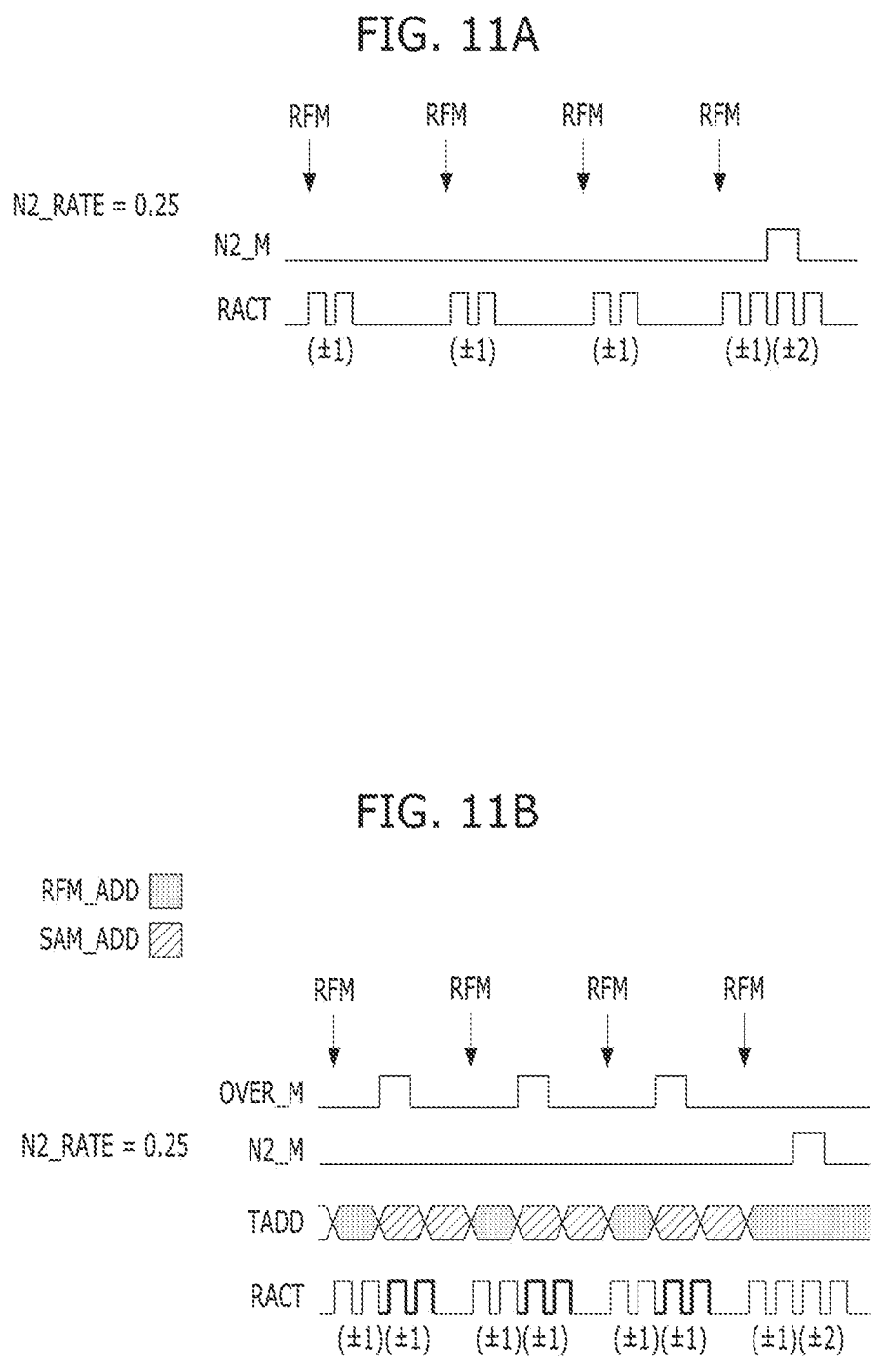

FIGS. 11A and 11B are timing diagrams for describing a conventional target refresh operation and a target refresh operation according to an embodiment of the present invention, depending on a preset refresh rate. In FIGS. 11A and 11B, the reference numeral "RACT" is a row active signal RACT generated by the row control circuit 620 to activate the rows according to the active command ACT and the precharge command PCG.

Referring to FIG. 11A, the activation of the additional refresh signal N2_M may be determined according to the refresh rate information N2_RATE. For example, when the refresh rate information N2_RATE is set to 0.25, the additional refresh signal N2_M may be activated every time the refresh management command RFM is input 4 times. Each time the refresh management command RFM is input, the memory device may generate the row-hammer addresses RH_ADD by increasing and/or decreasing the first aggressive address RFM_ADD by one (1). Further, whenever the number of inputs of the refresh management command RFM reaches 4, the memory device may generate the row-hammer addresses RH_ADD by increasing and/or decreasing the first aggressive address RFM_ADD by one (1), and then increasing and/or decreasing the first aggressive address RFM_ADD by two (2) according to the additional refresh signal N2_M. Accordingly, the memory device may refresh the second adjacent rows once every time the first adjacent rows are refreshed 4 times.

Referring to FIG. 11B, the memory device 100 according to an embodiment of the present invention may activate the detection signal OVER_M when the refresh management command RFM is input and the additional refresh signal N2_M stays deactivated, and select the second aggressive address SAM_ADD as the target address TADD according to the detection signal OVER_M. Accordingly, the memory device 100 may refresh the first adjacent rows of a target row corresponding to the second aggressive address SAM_ADD if the target refresh operation is not performed on the second adjacent rows of a target row corresponding to the first aggressive address RFM_ADD.

Hereinafter, a method of operating the memory system 10 according to the third embodiment of the present invention will be described with reference to FIGS. 10 to 12.

Figure 12:
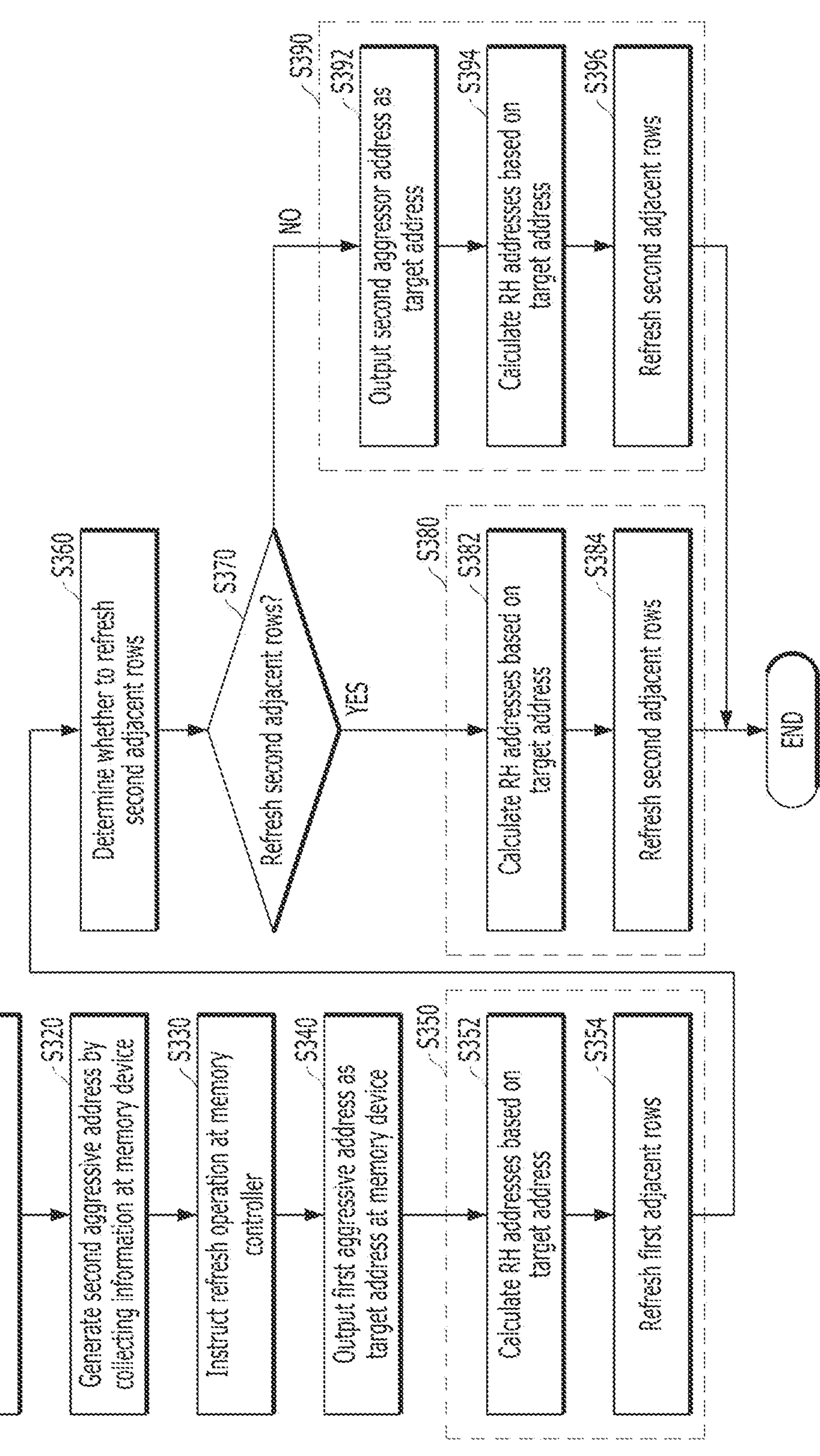
FIG. 12 is a flow chart for describing an operation of a memory system including the memory device of FIG. 10, in accordance with the third embodiment of the present invention.

FIG. 12 is a flow chart for describing an operation of a memory system including the memory device of FIG. 10, in accordance with the third embodiment of the present invention.

Referring to FIG. 12, the memory controller 200 may collect information on rows subjected to a row-hammer attack (at S310).

The memory device 100 may generate the second aggressive address SAM_ADD by collecting information on rows subjected to a row-hammer attack (at S320). For example, the address sampling circuit 146 may store the internal address IADD input with the active command ACT as the second candidate addresses and output the second aggressive address SAM_ADD by selecting one of the second candidate addresses according to counting values which are generated by counting the numbers of inputs of the respective second candidate addresses.

The memory controller 200 may apply the refresh management command RFM to perform a target refresh operation (at S330).

The refresh latch 642 may output the first aggressive address RFM_ADD by latching the internal address IADD input with the refresh management command RFM, and the output control circuit 648 may output the first aggressive address RFM_ADD as the target address TADD (at S340).

The adjacent address calculating circuit 649 may calculate one or more row-hammer addresses RH_ADD for specifying the first adjacent rows of the target row, by increasing and/or decreasing the target address TADD by one (1) (at S352). The row control circuit 620 may perform a target refresh operation of refreshing one or more adjacent rows corresponding to the row-hammer addresses RH_ADD according to the refresh management command RFM (at S354). As a result, the memory device 100 may perform a target refresh operation to refresh the first adjacent rows of the target row corresponding to the first aggressive address RFM_ADD provided from the memory controller 200 according to the refresh management command RFM provided from the memory controller 200 (at S350).

The detection circuit 644 may determine whether to activate the additional refresh signal N2_M according to the refresh rate information N2_RATE when the refresh management command RFM is input (at S360).

When it is determined that the target refresh operation for the second adjacent rows is performed, and thus the additional refresh signal N2_M is activated ("YES" in S370), the adjacent address calculating circuit 649 may calculate one or more row-hammer addresses RH_ADD for specifying the second adjacent rows of the target row, by increasing and/or decreasing the target address TADD by two (2) (at S382). The row control circuit 620 may perform a target refresh operation of refreshing one or more adjacent rows corresponding to the row-hammer addresses RH_ADD according to the refresh management command RFM (at S384). As a result, the memory device 100 may perform a target refresh operation to refresh the second adjacent rows of the target row corresponding to the first aggressive address RFM_ADD provided from the memory controller 200 according to the refresh management command RFM provided from the memory controller 200 (at S380).

On the contrary, when it is determined that the target refresh operation for the second adjacent rows is not performed, and thus the additional refresh signal N2_M is deactivated ("NO" in S370), the detection circuit 644 may activate the detection signal OVER_M, and the output control circuit 648 may output the second aggressive address SAM_ADD as the target address TADD (at S392). As the additional refresh signal N2_M is deactivated, the adjacent address calculating circuit 649 may calculate one or more row-hammer addresses RH_ADD by increasing and/or decreasing the target address TADD by one (1) (at S394). The row control circuit 620 may perform a target refresh operation of refreshing one or more adjacent rows corresponding to the row-hammer addresses RH_ADD according to the refresh management command RFM (at S396). As a result, the memory device 100 may perform a target refresh operation to refresh the first adjacent rows of the target row corresponding to the second aggressive address SAM_ADD internally sampled, according to the refresh management command RFM provided from the memory controller 200 (at S390).

As described above, the memory device 100 according to the embodiments of the present invention may perform a target refresh operation on a row corresponding to the first aggressive address provided from the outside, or the second aggressive address sampled by itself, according to the refresh management command RFM. Accordingly, the refresh operation may be performed flexibly, thereby increasing the refresh efficiency and maximizing the defense capability against the row-hammer attack.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal.

What is claimed is:

1. A memory device, comprising:

a refresh latch configured to generate a first aggressive address by latching an address input with a refresh management command, wherein the address input with the refresh management command includes first information on row-hammer-attacked rows having been subjected to a row-hammer attack, the first information collected by a memory controller based on at least one method of counting an activation number of the row-hammer-attacked rows and randomly sampling rows activated in the memory device;

a detection circuit configured to:

determine, according to refresh rate information, whether to activate an additional refresh signal when the refresh management command is input, and generate a detection signal when the refresh management command is input and the additional refresh signal is determined to be deactivated;

an address sampling circuit configured to generate a second aggressive address by collecting second information on the row-hammer-attacked rows having been subjected to the row-hammer attack based on the activation number of the row-hammer-attacked rows;

a row control circuit configured to refresh, according to the refresh management command, one or more first adjacent rows of a first target row corresponding to the first aggressive address; and the row control circuit configured to refresh, according to the refresh management command, one or more adjacent rows of a second target row corresponding to the second aggressive address when it is determined that refreshing for second adjacent rows of the first target row is omitted according to refresh rate information; and an output control circuit configured to output, as a target address, the first aggressive address or the second aggressive address according to the refresh management command and the detection signal.

2. The memory device of claim 1, further comprising: an adjacent address calculating circuit configured to calculate, using the target address, one or more row-hammer addresses according to the additional refresh signal.

3. The memory device of claim 2, wherein the adjacent address calculating circuit is configured to:

calculate the row-hammer addresses by increasing and/or decreasing the target address by one (1) when the additional refresh signal is deactivated; and calculate the row-hammer addresses by increasing and/or decreasing the target address by two (2) when the additional refresh signal is activated.

4. The memory device of claim 1, wherein the output control circuit is configured to output as the target address:

the first aggressive address in response to the refresh management command, and the second aggressive address in response to the detection signal.

* * * * *